US 8,107,959 B2

(12) United States Patent
Kogure

(10) Patent No.: US 8,107,959 B2
(45) Date of Patent: Jan. 31, 2012

(54) MOBILE COMMUNICATION SYSTEM AND HANDOVER CONTROL METHOD

(75) Inventor: Yuki Kogure, Minato-ku (JP)

(73) Assignee: NEC Corporation, Tokyo (JP)

( * ) Notice: Subject to any disclaimer, the term of this patent is extended or adjusted under 35 U.S.C. 154(b) by 1020 days.

(21) Appl. No.: 11/850,950

(22) Filed: Sep. 6, 2007

(65) Prior Publication Data

US 2008/0085708 A1 Apr. 10, 2008

(30) Foreign Application Priority Data

Oct. 10, 2006 (JP) ................................. 2006-276676

(51) Int. Cl.
*H04W 36/00* (2009.01)
*H04W 4/00* (2009.01)

(52) U.S. Cl. ........................................ 455/436; 370/331

(58) Field of Classification Search .................. 455/436, 455/437, 438, 439, 440, 441, 442, 443, 444; 370/331, 332, 333, 334, 335, 336, 337, 338
See application file for complete search history.

(56) References Cited

U.S. PATENT DOCUMENTS

| 6,026,301 | A * | 2/2000 | Satarasinghe | 455/436 |
|---|---|---|---|---|
| 6,321,089 | B1 * | 11/2001 | Han | 455/438 |
| 6,326,841 | B1 * | 12/2001 | Laureanti | 330/53 |
| 6,549,524 | B1 * | 4/2003 | Shin | 370/331 |
| 7,269,422 | B2 * | 9/2007 | Gunnarsson et al. | 455/442 |
| 7,725,121 | B2 * | 5/2010 | Ishii et al. | 455/522 |
| 2005/0070285 | A1 * | 3/2005 | Goransson | 455/436 |
| 2005/0118993 | A1 | 6/2005 | Roux et al. | |
| 2005/0221825 | A1 * | 10/2005 | Osugi | 455/436 |

FOREIGN PATENT DOCUMENTS

| EP | 1117269 A1 | 7/2001 |
|---|---|---|
| EP | 1235454 A2 | 8/2002 |
| EP | 1499147 A1 | 1/2005 |
| JP | 9-224276 A | 8/1997 |
| JP | 9-327059 A | 12/1997 |
| JP | 10-28281 A | 1/1998 |
| JP | 11-155165 A | 6/1999 |
| JP | 2004-72179 A | 3/2004 |
| JP | 2004-336635 A | 11/2004 |
| JP | 2005-311498 A | 11/2005 |
| JP | 2006-54625 A | 2/2006 |
| JP | 2006-157555 A | 6/2006 |
| WO | 02/102109 A1 | 12/2002 |
| WO | 2005/002270 A1 | 1/2005 |

* cited by examiner

*Primary Examiner* — George Eng
*Assistant Examiner* — Scott Au
(74) *Attorney, Agent, or Firm* — Sughrue Mion, PLLC

(57) ABSTRACT

When a base station receives a report of signal power of a common pilot channel of each cell received at a mobile station, the base station converts the received signal power in the report on the basis of the transmission power of the common pilot channel of each of the cells. A base station controller determines the cell to which the mobile station is to be connected on the basis of the received signal power of the common pilot channel in each cell.

13 Claims, 8 Drawing Sheets

MOBILE COMMUNICATION SYSTEM AND HANDOVER CONTROL METHOD

This application is based upon and claims the benefit of priority from Japanese Patent Application No. 2006-276676 filed on Oct. 10, 2006, the content of which is incorporated by reference.

BACKGROUND OF THE INVENTION

1. Field of the Invention

The present invention relates to a mobile communication system and, in particular, to handover control in a mobile communication system.

2. Description of the Related Art

One of communication schemes used in mobile communication systems is CDMA (Code Division Multiple Access). In a mobile communication system that uses CDMA, multiple signals in the same frequencies can be distinguished from each other by using multiple spread codes. Therefore, the same frequency can be used to form multiple cells.

In such a CDMA mobile communication system, a mobile station receives signals having a certain frequency and extracts a desired signal from among the received signals by performing despreading using one spread code. The mobile station can receive signals from multiple cells at a time by using multiple spread codes. The mobile station switches between cells from which the mobile station is to receive a signal while receiving signals from multiple cells at one time, thus implementing seamless handover.

In order to allow mobile stations to determine handover, a radio base station sends different CPICH (common pilot channel) signals for different cells. A mobile station receives a CPICH signal, identifies the cell that sent the CPICH signal, and compares the power of the received CPICH signal with a threshold. The comparison is made in order to determine the line conditions of the path of the CPICH signal. Based on the result of the comparison of each received CPICH signal with the threshold, the mobile station determines a cell from which the mobile station should receive a signal. The cell from which a mobile station receives a signal will be referred to as handover target cell. Once the mobile station determines a cell from which the mobile station will receive a signal, namely a handover target cell, the mobile station adds and/or deletes a cell on the basis of the determination. Any value of the threshold within the limits of signal power at which signals can be received can be set.

However, the transmission power of CPICH signals from radio base stations are not equal among all cells. When the transmission power of CPICH signals differs among cells, a mobile station cannot properly determine the line conditions of paths on the basis of the power of CPICH signals that the mobile station received.

On the other hand, an uplink dedicated channel signal directed from a mobile station to cells, for example, is transmitted at a common level, and the transmission power does not differ in the cells. The received power of the uplink dedicated channel signal varies depending on losses on paths. Because a mobile station makes determination regarding handover on the basis of the received power of CPICH signals, it is possible that a path with a large loss is selected as a handover target. If this occurs, the power of the signal of the uplink dedicated channel received at the radio base station is weakened.

Like a mobile station, a radio base station can combine signals received in multiple cells. When a path that has a small loss is included in a set of multiple selected paths, the radio base station can receive a dedicated channel signal having relatively good quality. However, when all the selected paths have large losses, possibly the radio base station cannot receive a dedicated channel signal that has a good quality.

FIG. 1 is a diagram illustrating the relationship between the power of a received CPICH signal and path loss. It is assumed here that CPICH signals from first and second cells reached a mobile station. PT1 in FIG. 1 represents the transmission power of the CPICH signal of the first cell and PT2 represents the transmission power of the CPICH signal of the second cell. PR1 represents the power of the CPICH signal from the first cell received at the mobile station and PR2 represents the power of the CPICH signal from the second cell received at the mobile station. L1 represents path loss between the first cell and the mobile station and L2 represents path loss between the second cell and the mobile station.

When the mobile station is at point A, PR1>PR2. Accordingly, the power of the signal received at the mobile station through the path from the first cell is greater than that of the signal through the path from the second cell and therefore the power of the signal through the path from the first cell seemed to be in a better condition. However, actual path losses are expressed as L1=PT1−PR1 and L2=PT2−PR2. As can be seen from FIG. 1, L1>L2, that is, path loss between the mobile station and the first cell is greater than path loss between the mobile station and the second cell. In spite of the fact that the loss in the uplink dedicated channel signal over the path between the mobile station and the second cell is greater than the loss in the uplink dedicated channel signal over the path between the mobile station and the first cell, the power of the signal received through the path between the mobile station and the second cell is higher.

On the other hand, unlike a common channel CPICH signal whose transmission power is fixed, the downlink dedicated channel signals from the cells to the mobile station are amplified to different degrees by transmission power control. When a path on which a large loss occurs is selected as a handover target, transmission power at a radio base station is controlled to a high level or the power of a signal of a downlink dedicated channel received at a mobile station can be decreased.

There is a CDMA mobile communication system that, unlike the system described above, allows a mobile station to use a downlink dedicated channel signal, in addition to a common channel signal, to determine a handover target cell (see Japanese Patent Laid-Open No. 2006-54625).

However, this technique has the following problem.

In the mobile communication system described in Japanese Patent Laid-Open No. 2006-54625, degradation of communication quality caused by the difference between a common channel signal and a downlink dedicated channel signal can be reduced because handover is made to a cell that transmits a downlink dedicated channel signal of a better quality. However, degradation of communication quality caused by the difference in transmission power of a CPICH signal, which is a common channel signal, between cells described above sometimes was not reduced.

An object of the present invention is to provide a mobile communication system capable of reducing degradation of communication quality caused by the difference between cells in transmission power of a common channel signal.

SUMMARY OF THE INVENTION

An exemplary object of the present invention is to provide a mobile communication system capable of reducing degradation of communication quality caused by the difference in transmission power of a common channel signal between cells.

In order to achieve the exemplary object, in an exemplary aspect of the invention, there is provided a mobile communication system that enables handover using multiple cells, including: a base station which forms a cell for connecting to a mobile station by radio and, when receiving from the mobile station a report of the received signal power of a common pilot channel of each of cells received by the mobile station, converts the received signal power in the report on the basis of the transmission power of the common pilot channel of each of the cells and transfers the report containing the converted received signal power; and a base station controller which receives the report transferred from the base station and determines a cell to which the mobile station is to be connected, on the basis of the received signal power of the common pilot channel of each of the cells that is contained in the report.

The above and other objects, features, and advantages of the present invention will become apparent from the following description with reference to the accompanying drawings which illustrate examples of the present invention.

DETAILED DESCRIPTION OF THE PREFERRED EMBODIMENTS

First Exemplary Embodiment

Figure 2:
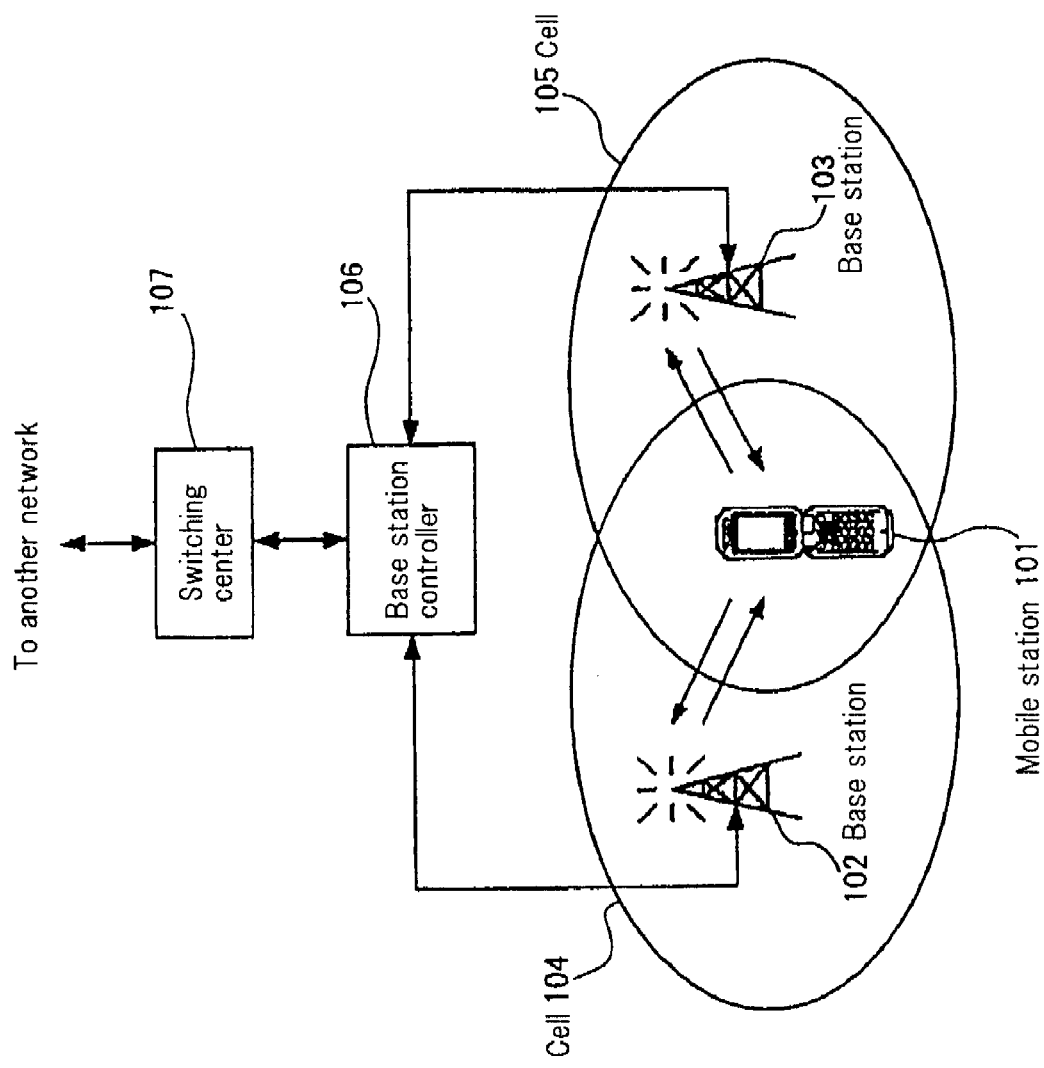
FIG. 2 is a block diagram showing a configuration of a mobile communication system according to a first exemplary embodiment.
Figure 3:
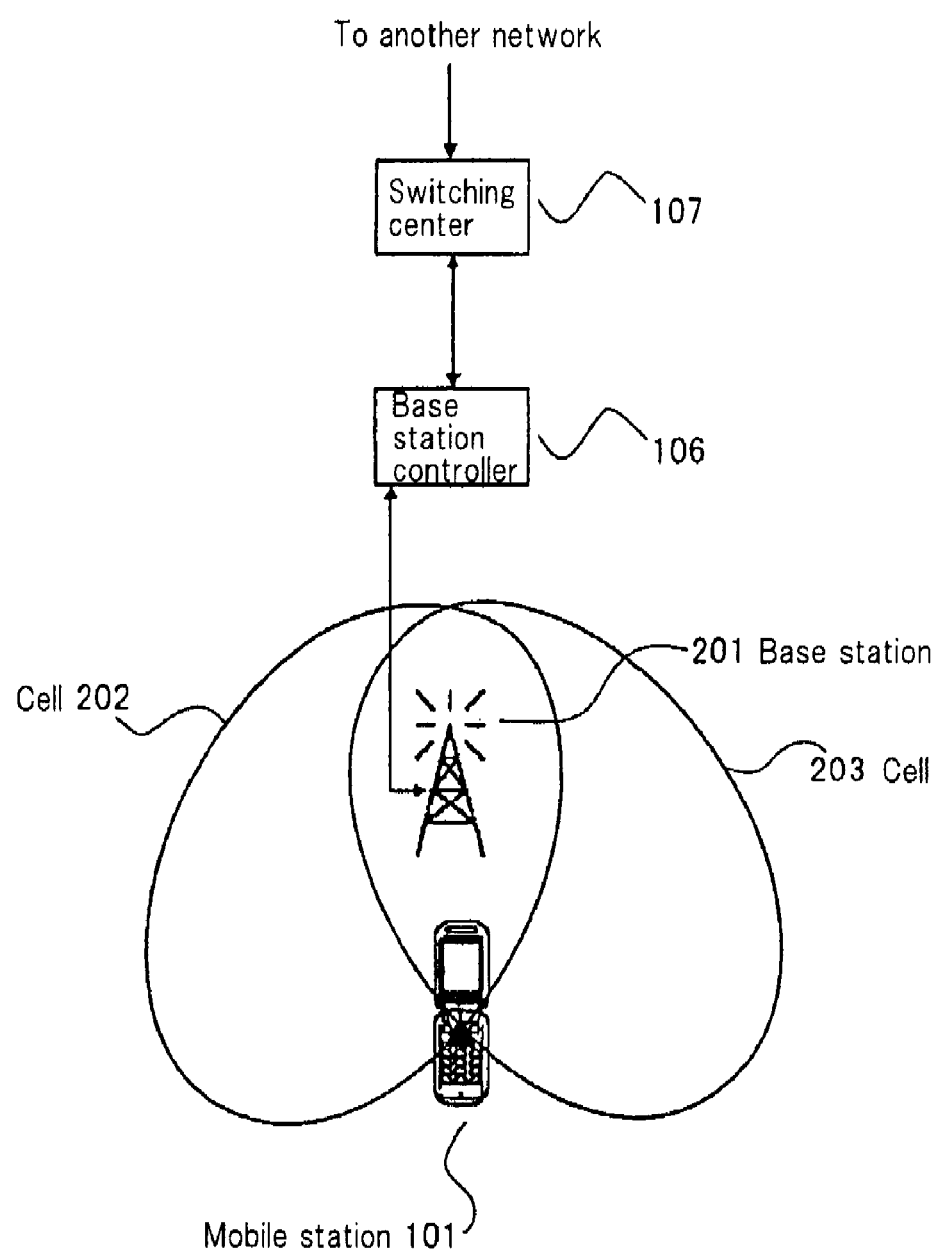
FIG. 3 is another block diagram showing a configuration of the mobile communication system according to the first exemplary embodiment.

FIGS. 2 and 3 are block diagrams showing configurations of a mobile communication system according to a first exemplary embodiment of the present invention. In FIG. 2, mobile station 101 is in a soft handover state. In FIG. 3, mobile station 101 is in a softer handover state. The soft handover state is a state in which handover is being made across multiple radio base stations. The softer handover state is a state in which handover is made across multiple cells of one radio base station.

Referring to FIG. 2, the mobile communication system according to the first exemplary embodiment includes base stations 102 and 103, base station controller 106, and switching center 107. Multiple base stations are connected to base station controller 106 and two of them, 102 and 103, are shown. The base station controller and base stations form a radio access network.

Mobile station 101 is a radio communication terminal, such as a mobile phone, that is capable of having multiple cells as handover targets and sending and receiving signals to and from the multiple handover target cells at the same time. Mobile station 101 in FIG. 2 sits in an overlapping region of two cells 104 and 105, has two cells 104 and 105 as handover target cells, and receives downlink signals from cells 104 and 105. An uplink signal transmitted from mobile station 101 is received by cells 104 and 105.

Base stations 102 and 103, which are connected to base station controller 106, are radio base stations that connect to mobile station 101 with a radio signal to enable communication between mobile station 101 and base station controller 106. Base station 102 in FIG. 2 forms cell 104 and base station 103 forms cell 105.

Base station controller 106 is connected with base stations 102 and 103 and switching center 107 and controls base stations 102 and 103 to enable mobile station 101 to perform communication. For example, base station controller 106 calls mobile station 101 through base station 102, 103 during establishment of a call and establishes and deletes a path in handover control during communication.

Switching center 107 is a device that is connected with base station controller 106 and another network and switches lines for communications performed by mobile station 101 through base station controller 106.

An operation of the mobile communication system in the state shown in FIG. 2 will be described. In the state shown in FIG. 2, mobile station 101 is in the soft handover state as described above and is connected to both base stations 102 and 103. Communication data of mobile station 101 is transmitted over both of path of cell 104 through base station 102 and path of cell 105 through base station 103. The communication data may be voice data, or non-voice data, or its control signal.

Mobile station 101 establishes a connection with base station controller 106 through base stations 102 and 103 and transmits and receives control information to and from base station controller 106 over the connection. Communication data transmitted from mobile station 101 is transferred to another network through base stations 102 and 103, base station controller 106, and switching center 107, and eventually to a correspondent node (not shown). Conversely, communication data transmitted from the correspondent node is transferred to mobile station 101 through the reverse path.

Referring to FIG. 3, base station 201 is connected to a base station controller 106. Base station 201 has functions similar to those of base stations 102 and 103 shown in FIG. 2. Unlike base stations 102 and 103, base station 201 forms two cells 202 and 203 having the same frequency. A mobile station 101 in FIG. 3 sits in an overlapping region of cells 202 and 203.

An operation of the mobile communication system in the state shown in FIG. 3 will be described. In the state shown in FIG. 3, mobile station 101 is in a softer handover state and is connected to both cells 202 and 203.

Communication data of mobile station 101 is transmitted through both of paths of cells 202 and 203. Mobile station 101 establishes a connection with base station controller 106 through base station 201 and transmits and receives control information to and from base station controller 106 over the connection. Communication data transmitted from mobile station 101 is transferred to another network through base station 201, base station controller 106, and switching center 107, and eventually to a correspondent node (not shown).

Conversely, communication data transmitted from the correspondent node is transferred to mobile station 101 through the reverse path.

Mobile station 101 in the state shown in FIG. 2 or 3 receives a CPICH signal of each cell from each base station and measures the received power of the CPICH signal of the cell received. Mobile station 101 provides measurement information including the result of the measured received signal power to base station controller 106 through the base station.

Base stations 102, 103, 201 convert the received signal power included in the measurement information transmitted from mobile station 101 before transferring the measured information to base station controller 106, rather than directly transferring the information. Specifically, the base station has stored the transmission power value of the CPICH signal of each cell beforehand. The base station corrects the received power of the CPICH signal included in the measurement information received from mobile station 101 on the basis of the transmission power value of that CPICH signal. This correction converts the received power of the CPICH signal to a value that reflects an estimated loss on the path.

Base station controller 106 determines a handover target cell on the basis of the received signal power of each cell measured at mobile station 101 and corrected at the base station and instructs the base station to establish or release the path of the CPICH signal of each cell when controlling handover.

Figure 4:
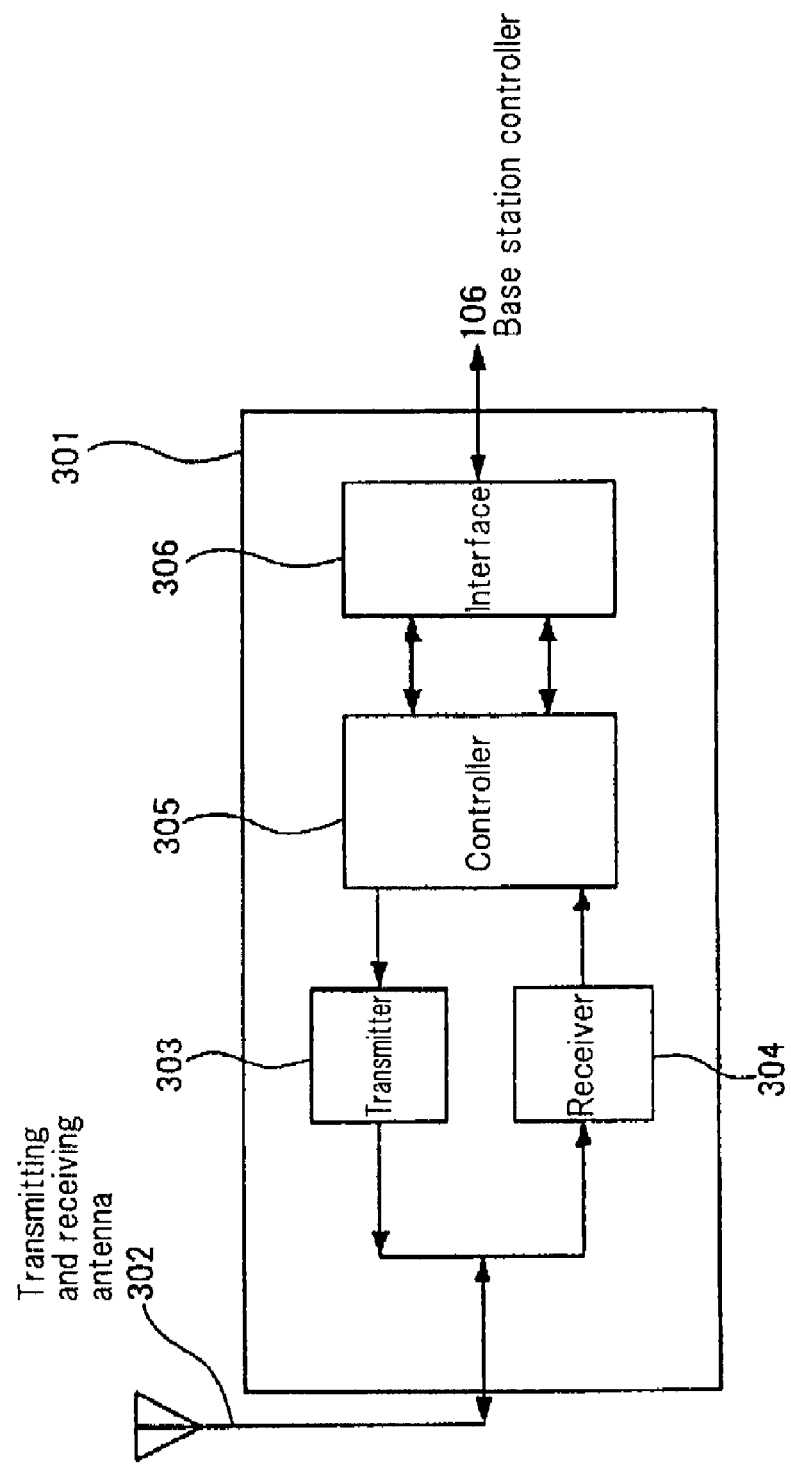
FIG. 4 is a block diagram showing a configuration of a base station according to the first exemplary embodiment.

FIG. 4 is a block diagram showing a configuration of a base station according to the first exemplary embodiment. The configuration of base station 301 shown in FIG. 4 is common among base stations 102 and 103 shown in FIG. 2 and base station 201 shown in FIG. 3.

Referring to FIG. 4, base station 301 includes a transmitting and receiving antenna 302, transmitter 303, receiver 304, controller 305, and interface 306. Transmitting and receiving antenna 302, transmitter 303, and receiver 304 are provided for each cell. Accordingly, base station 201 that forms multiple cells includes multiple transmitting and receiving antennas 302, transmitters 303, and receivers 304.

Transmitting and receiving antenna 302 is designed for transmitting and receiving radio signals and is used in communication with mobile stations 101.

Transmitter 303 amplifies communication data, which is an RF signal, from controller 305 to be transmitted and transmits the amplified communication data to mobile station 101 through transmitting and receiving antenna 302. The degree of amplification of communication data by transmitter 303 is variable and is set in accordance with an instruction from controller 305. The instruction from controller 305 is based on TPC (Transmit Power Control) information provided by mobile station 101. Since communication data is transmitted through a dedicated channel, the CPICH signal of a common channel is amplified separately from the communication data. The CPICH signal is transmitted at a transmission power that is fixed for each cell.

Receiver 304 amplifies an RF signal received from mobile station 101 through transmitting and receiving antenna 302 and sends the amplified RF signal to controller 305. In addition to a wanted RF signal from a user (mobile station 101), an unwanted interference signal is received at receiver 304 at the same time. Receiver 304 includes the function of measuring RTWP (Received total wideband power) and reporting it to controller 305.

Controller 305 controls and relays communication between mobile station 101 and base station controller 106 and controls various circuits in base station 301. Specifically, controller 305 performs error-correcting coding and spreading of a signal to be transmitted. Controller 305 performs chip synchronization, despreading, rake-combining, and error-correction decoding of a received signal. Controller 305 also measures the SIR of a signal received in each cell from a mobile station 101. Controller 305 controls uplink and downlink transmission power. In uplink transmission power control, Controller 305 transmits TPC information determined based on the measured SIR to mobile station 101 through transmitter 303. The TPC information includes information that provides instructions to increase or decrease the degree of amplification. In downlink transmission power control, controller 305 controls the degree of amplification by transmitter 304 on the basis of TPC information received from mobile station 101.

Controller 305 also performs a process unique to the exemplary embodiment. The process unique to the exemplary embodiment is one in which the power of a received CPICH signal contained in measurement information from mobile station 101 is converted and then the information is transmitted to base station controller 106. Controller 305 stores the transmission power value of CPICH signal of each cell beforehand and corrects the value of the power of the CPICH signal received based on the transmission power value. The correction relatively decreases the received signal power of a cell in which the transmission power value of the CPICH signal is large and increases the received signal power of a cell in which the transmission power value is small. The correction reduces the influence of the difference in transmission power-value between cells and thus the received signal power in the measurement information will accurately indicate the line conditions of the path of each cell. As a result, degradation of communication quality is reduced.

Interface 306 is a communication interface with base station controller 106 and transmits and receives signals transmitted and received between controller 305 and base station controller 106 to and from base station controller 106 through a transmission channel.

An operation of the mobile communication system according to the exemplary embodiment will be described. It is assumed here that the transmission power value of the CPICH signal of cell 203 is greater than that of cell 202. It is also assumed that mobile station 101 communicating with both cells 202 and 203 as handover target cells, as shown in FIG. 3, is moving and approaching cell 203.

Mobile station 101 continuously measures the power of the received CPICH signal of cell 202 and the power of a received CPICH signal of cell 203 and reports the measured powers to the base station controller 106 through the base station 201 as measurement information. The base station 201 receives the measurement information from the mobile station 101, converts the received signal powers contained in the measurement information, as described above, and transmits the measurement information to the base station controller 106.

In base station 201, the measurement information from the mobile station 101 is provided to the controller 305 through the receiver 304. The controller 305 corrects the received signal power contained in the measurement information on the basis of the transmission power value of the CPICH signals of the cells associated with the measurement information and transmits the corrected received signal power to base station controller 106 through interface 306 as measurement information.

If the power of the received CPICH signal of cell 203 is greater than or equal to a predetermined threshold or if the power of the received CPICH signal of cell 202 is smaller than or equal to a predetermined threshold, base station controller 106 determines that only cell 203 is a handover target cell and starts a process for deleting the path of cell 202.

The correction by controller 305 at the base station may be, for example, to subtract the difference between the transmission power value of the CPICH signal and a predetermined reference value from the received signal power included in the measurement information provided by mobile station 101. In another example, the transmission power value of the CPICH signal may simply be subtracted from the received signal power included in the measurement information. In this case, the resulting received signal power will be a negative value and therefore the threshold used in base station controller 106 may be set by taking this into account. In yet another example, the difference between the transmission powers of the CPICH signals of cells 202 and 203 may be subtracted from the received signal power of one of the CPICH signals in cells 202 and 203 whose transmission power from same base station 201 is higher. In yet another example, the difference between the transmission power of the CPICH signals of cells 202 and 203 may be added to the received signal power of one of the CPICH signals in cells 202 and 203 whose transmission power from the same base station 201 is lower.

While an example is shown in which the received signal power value is corrected, the present invention is not so limited. Any correction may be made that can reduce the influence of the difference in transmission power value of CPICH signals between the cells on the measurement information reported from mobile station 101 to base station controller 106 so that the accuracy of estimation of path loss is increased. For example, the transmission power value of the CPICH signal of the cell may be added to the report of the measurement information including the received signal power and the measurement information may be transmitted to base station controller 106. The conversion of received signal power described above includes this.

In that case, base station controller 106 may determine a handover target cell on the basis of the received signal power included in the report of the measurement information provided by mobile station 101 and on the basis of the transmission power value included in the report provided by base station 201.

Figure 5:
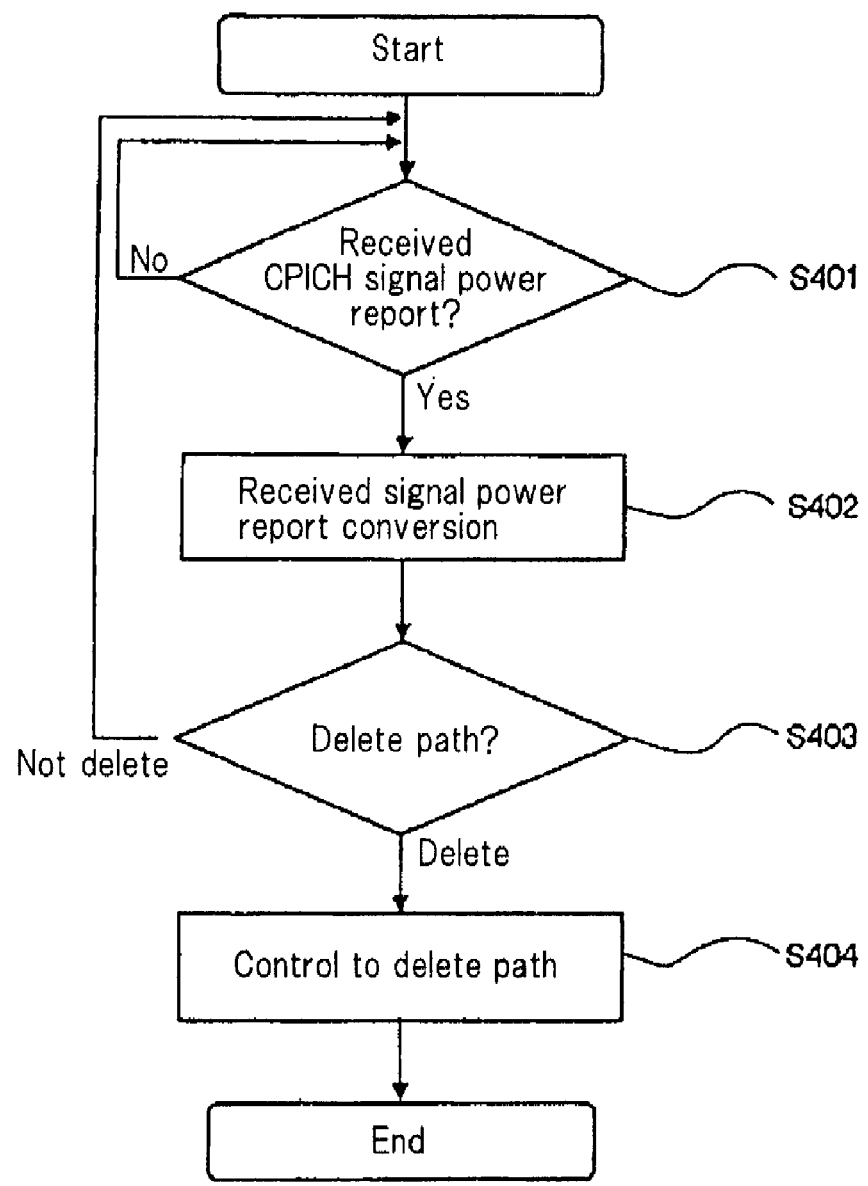
FIG. 5 is a flowchart of an operation of the mobile communication system according to the first exemplary embodiment.

FIG. 5 is a flowchart of an operation of the mobile communication system according to the first exemplary embodiment. Referring to FIG. 5, base station 201 first monitors for reception of a CPICH signal received power report from a mobile station 101 (step S401). The CPICH signal received power report is a report of measurement information about the power of a CPICH signal received at mobile station 101. When base station 201 receives CPICH signal received power report, base station 201 converts the received signal power value in the report and then transmits the CPICH signal received power report to base station controller 106 (S402).

Base station controller 106 receives the CPICH signal received power report and makes a path deletion determination (step S403). The path deletion determination is a determination as to whether a cell for which the received CPICH signal power report has been made should be removed from handover target cells. Base station controller 106 compares the received signal power value contained in the received CPICH signal power report with a stored threshold to make the determination. If base station controller 106 determines that the path should not be deleted, base station controller 106 returns to step S401.

If base station controller 106 determines that the path should be deleted, base station controller 106 performs path deletion control (step S404). In the path deletion control, base station controller 106 instructs base station 201 and mobile station 201 to delete the path.

While deletion of the path is illustrated here, base station 201 similarly converts received signal power value contained in the CPICH signal received power report from mobile station 101 when a path is added.

Figure 1:
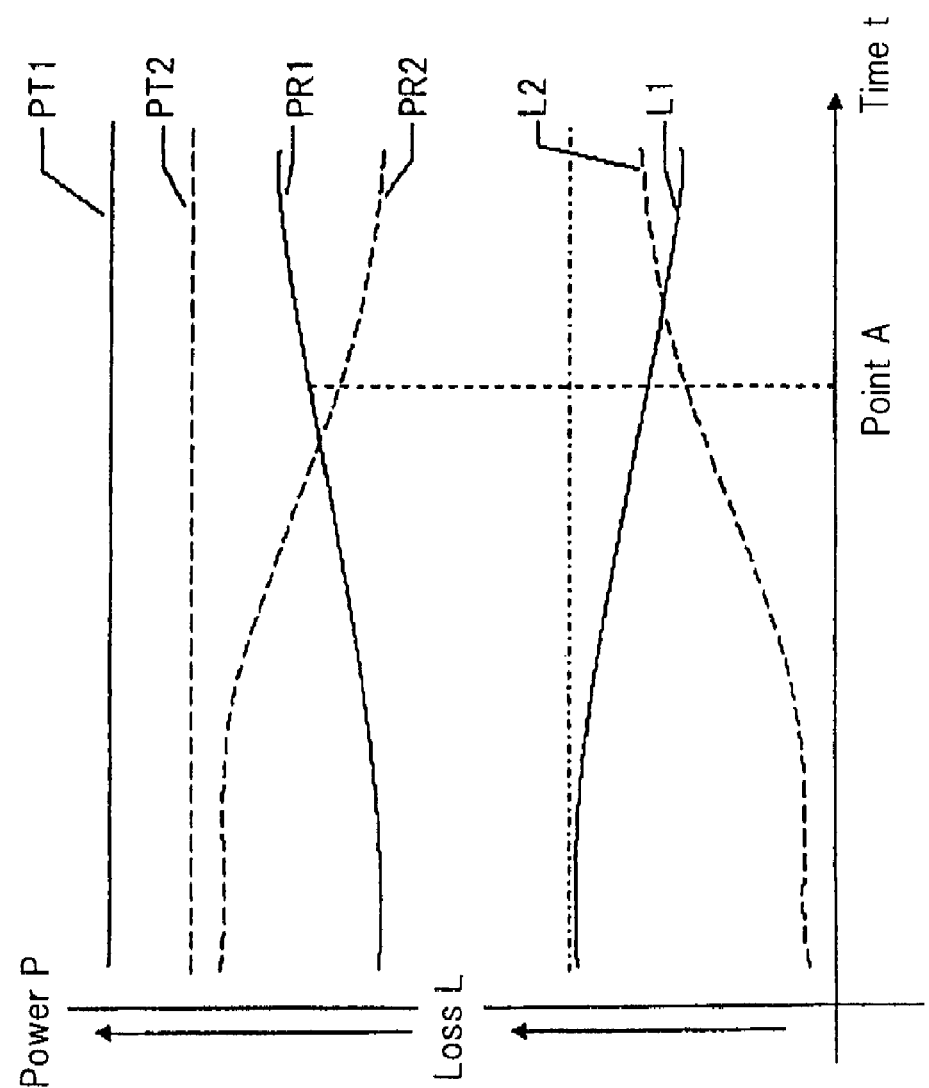
FIG. 1 is a diagram illustrating the relationship between the power of a received CPICH signal and path loss.

An exemplary operation of the mobile communication system according to the exemplary embodiment will be described which is performed when a state transition, as shown in FIG. 1, occurs as mobile station 101 moves.

PT1 represents the transmission power of a CPICH signal of cell 202 and PT2 represents the transmission power of a CPICH signal of cell 203. PR1 represents the power of the CPICH signal received at mobile station 101 from cell 202 and PR2 represents the power of the CPICH signal received at mobile station 101 from cell 203. L1 represents path loss between cell 202 and mobile station 101 and L2 represents path loss between cell 203 and mobile station 101.

As can be seen from FIG. 1, the transmission power PT1 of the CPICH signal from cell 203 is higher than the transmission power PT2 of the CPICH signal from cell 202. It is assumed here that mobile station 101 is moving away from cell 202 toward cell 203.

Measurement information provided by mobile station 101 includes the power PR1 of the received CPICH signal of cell 202 and the power PR2 of received CPICH signal of cell 203. As mobile station 101 moves, the received signal power values PR1 and PR2 change as shown in the chart of FIG. 1.

At point A, the received signal power PR1 of cell 202 is higher than that of cell 203. This is because the CPICH signal of cell 202 is transmitted at higher power than the CPICH signal of cell 203. Actual losses on the paths of cells 202 and 203 are related as L1<L2.

Base station 201 corrects the received signal power values PR1 and PR2 from mobile station 101 to values reflecting estimated losses L1 and L2, that is, values indicating line conditions of the paths. As can be seen from the chart, the line quality of the path of cell 203 is still higher than that of the path of cell 202 at point A and therefore cell 202 should not be excluded from handover targets. Therefore, base station controller 106 does not yet delete cell 202 at this point. In this way, the exemplary embodiment can prevent the path of cell 202 having low loss from being improperly removed from handover targets. Consequently, degradation of communication quality caused by a difference in the transmission power of CPICH signals between cells can be reduced.

When a corrected received signal power value eventually satisfies a condition for deleting cell 202, base station controller 106 deletes cell 202.

In the mobile communication system according to the exemplary embodiment, base stations 102, 103 convert the values of received signal power included in measurement information provided by mobile station 101 even when mobile station 101 is in the soft handover state shown in FIG. 2. Base station controller 106 determines a handover target cell on the basis of measurement information converted at base stations 102, 103. Thus, handover control according to the conditions of the path of each cell can be performed in the soft handover state and degradation of communication quality caused by a difference in transmission power of common channel signals between cells can be reduced.

Second Exemplary Embodiment

In a mobile communication system according to a second exemplary embodiment, base station controller 106, instead of a base station, converts measurement information provided by mobile station 101.

A basic configuration of the mobile communication system according to the second exemplary embodiment is the same as that of the first exemplary embodiment shown in FIGS. 2 and 3. However, controller 305 of base station 301 transfers measurement information including a measured value of the power of a received CPICH signal received from mobile station 101 through receiver 304 directly to base station controller 106 without conversion. On the other hand, when base station controller 106 determines a handover target cell on the basis of measurement information received from mobile station 101 through the base station, base station controller 106 converts the received signal power included in the measurement information and uses the converted value.

Conversion of received signal power in the second exemplary embodiment may be performed in a manner similar to conversion performed by base station 301 in the first exemplary embodiment.

Third Exemplary Embodiment

In a mobile communication system according to a third exemplary embodiment, base station 301 uses RTWP (Received Total Wideband Power) information, in addition to the transmission power of CPICH signals, in conversion of received signal power reported by mobile station 101.

RTWP is the total received signal power of a cell and can be an interference component of the reception signal at base station 301. Therefore, preferably a path with a high RPWP is removed from a set of handover target cells and a path with a low RTWP is left. To this end, the received signal power of a cell with a high RTWP may be reduced to a relatively low value and the received signal power of a cell with a lower RTWP may be increased to a relatively high value. For example controller 305 of base station 301 may measure the RPWP of a cell. If the RPWP is greater than a predetermined threshold, controller 305 performs, when converting the received signal power of the cell, conversion described with respect to the first exemplary embodiment and then subtracts a predetermined RTWP adjustment value.

As a result, the received signal power in measurement information will more accurately reflect the line conditions of the path of each cell and therefore degradation of communication quality can be further reduced.

While an example has been given in which base station 301 converts received signal power, the present invention is not so limited. A base station controller 106 may perform, in converting the received signal power of a cell, the conversion described with respect to the second exemplary embodiment and then subtract a predetermined RTWP adjustment value. In this case, base station 301 may report a measured RTWP value to base station controller 106.

Fourth Exemplary Embodiment

In a mobile communication system according to a fourth exemplary embodiment, base station 301 uses SIR (Signal to Interference Ratio) information in addition to the transmission power of a CPICH signal in converting received signal power reported by mobile station 101. The SIR is the signal to interference power ratio.

If SIR is high, it means that the power of a received wanted signal is high compare with the power of a received interference signal. Therefore, preferably a cell with a high SIR is selected as a handover target and a cell with a low SIR is removed from a set of handover targets. To this end, the received signal power of a cell with a high SIR may be increased to a relatively high value and the received signal power of a cell with a low SIR may be reduced to a relatively low value. For example, controller 305 of a base station 301 measures the SIR of a cell. If the SIR is smaller than or equal to a predetermined threshold, controller 305 may perform, in converting the received signal power of the cell, the conversion described with respect to the first exemplary embodiment and then subtract a predetermined SIR adjustment value.

As a result, the received signal power in measurement information will more accurately reflect the line conditions of the path of each cell and therefore degradation of communication quality can be reduced.

While an example has been given in which base station 301 converts received signal power, the present invention is not so limited. For example, base station controller 106 may perform, in converting the received signal power of a cell, the conversion described with respect to the second exemplary embodiment and then subtract a predetermined SIR adjustment value. In this case, base station 301 may report a measured SIR value to base station controller 106.

Fifth Exemplary Embodiment

In the mobile communication system according to a fifth exemplary embodiment, base station 301 performs the operation of the first exemplary embodiment and, in addition, adds or deletes uplink paths of multiple cells that use the same frequency, at the same time during control of handover. This can increase the received power of uplink dedicated channel signals.

When base station 301 receives from base station controller 106 an instruction to add a cell as a handover target, the base station establishes a path to mobile station 101 by using the cell and other cells that use the same frequency as that of the cell in the uplink direction. Thus, the multiple cells that use the same frequency are added as handover targets in the uplink direction. When base station 301 receives an instruction from base station controller 106 to delete a cell from a set of handover targets, base station 301 deletes path to mobile station 101 that uses the cell and other cells that use the same frequency as the cell in the uplink direction.

It should be noted that when base station 301 is instructed to add or delete a cell to or from a set of handover target cells, base station 301 may add or delete at least one cell together with that cell in the uplink direction. Base station 301 may add or delete all the cells that use the same frequency to or from a set of handover target cells.

When establishing an uplink path, base station 301 makes predetermined settings in each functional section of base station 301 so that an uplink dedicated channel is made available. With this, an uplink path is created that passes through antenna 302, receiver 304 and controller 305.

Thus, base station 301 can always receive signals through multiple paths for an uplink dedicated channel. As a result, the received power of uplink communication data can be increased and data losses and signal degradation can be reduced.

Figure 6:
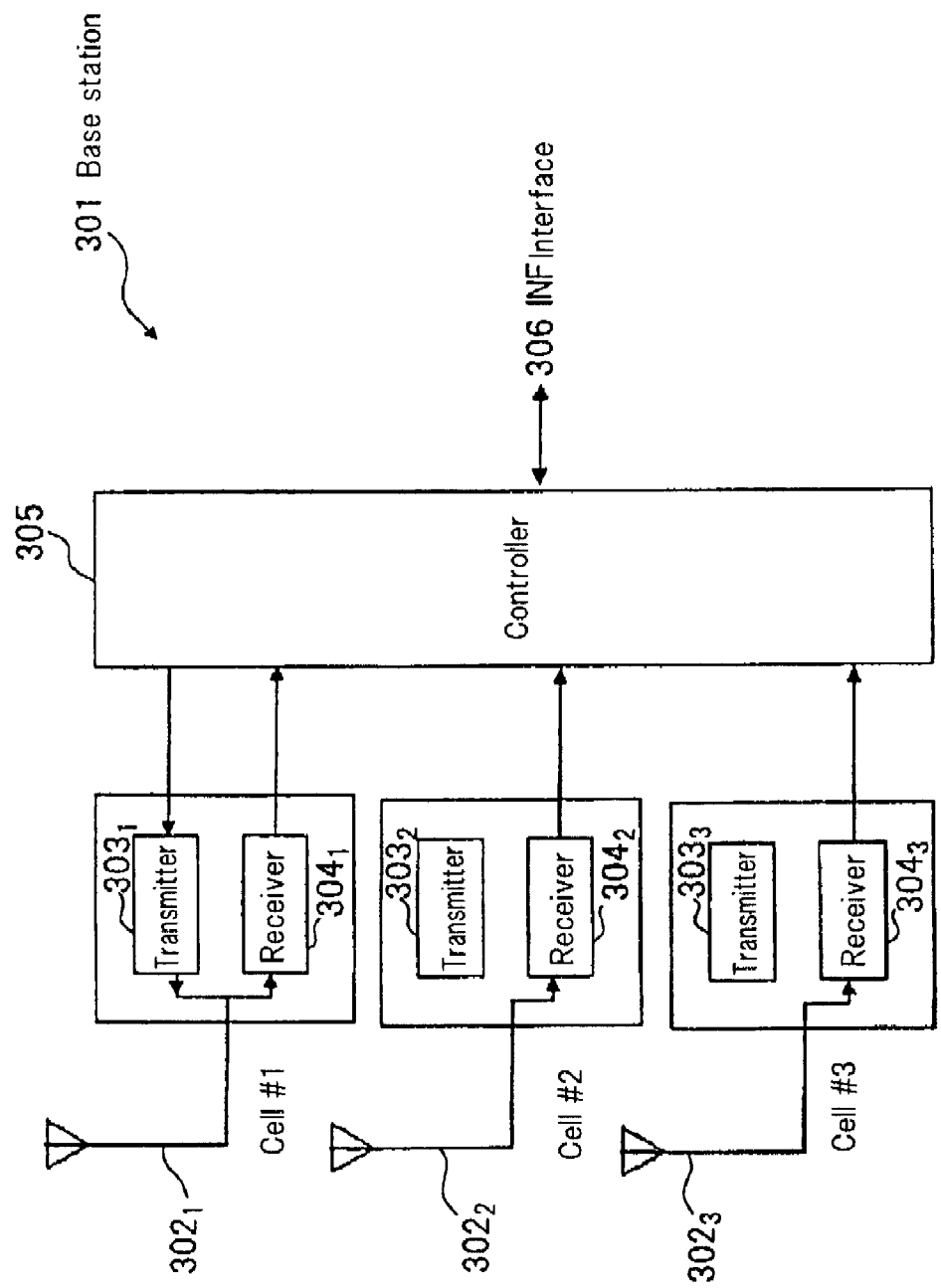
FIG. 6 is a diagram illustrating establishment of a path by a base station according to a fifth exemplary embodiment.

FIG. 6 is a diagram for illustrating establishment of a path by a base station according to a fifth exemplary embodiment. Referring to FIG. 6, base station 301 capable of forming three cells, cells #1 to #3, is shown. It is assumed here that base station 301 is requested by base station controller 106 to establish a path to a mobile station 101 using cell #1. When base station 301 receives the request, base station 301 establishes uplink and downlink paths of cell #1 and also establishes only uplink paths for cells #2 and #3.

Figure 7:
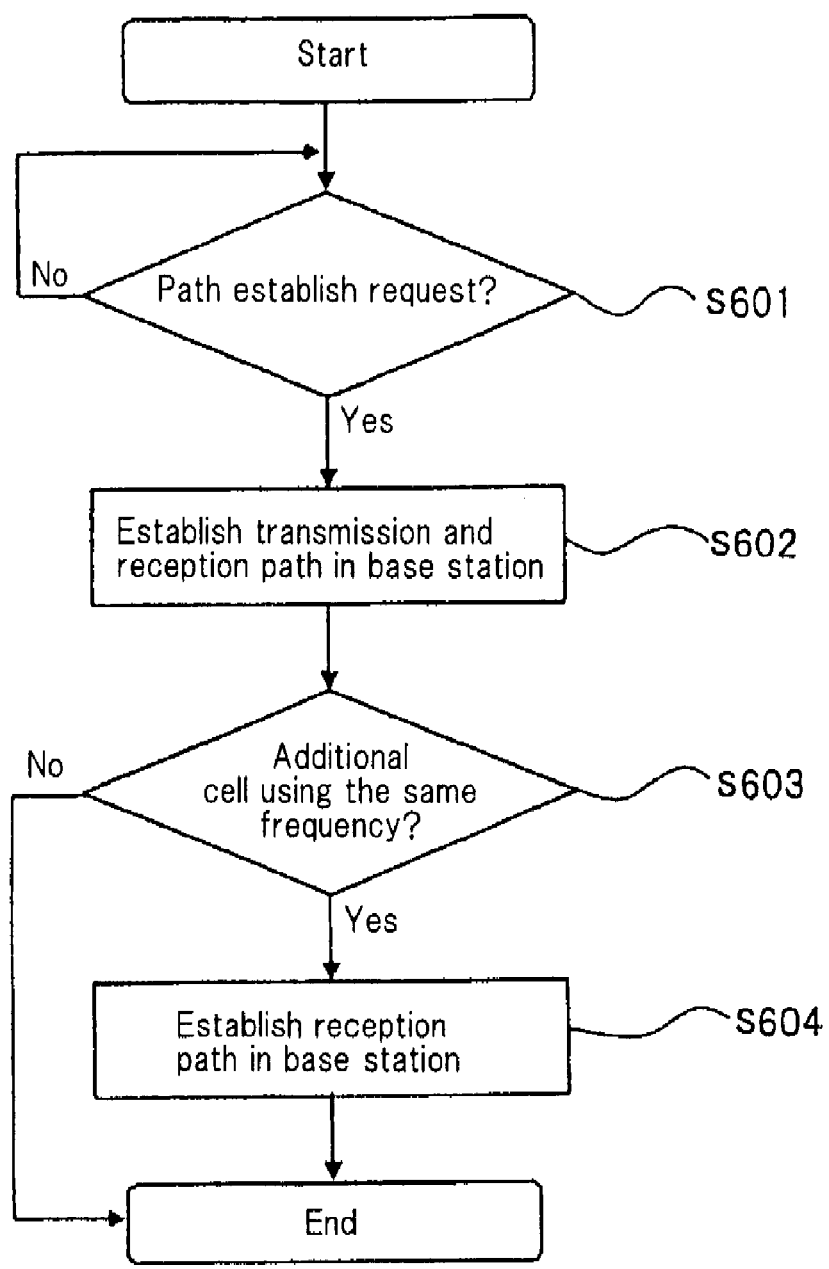
FIG. 7 is a flowchart of a path establishing operation in the mobile communication system according to the fifth exemplary embodiment.

FIG. 7 is a flowchart showing a path establishing operation performed in the mobile communication system according to the fifth exemplary embodiment. Referring to FIG. 7, base station 301 first monitors for reception of a path establish request from base station controller 106 (step S601). When base station 301 receives a path establish request, base station 301 establishes uplink and downlink paths for a cell specified in the request (step S602).

Then, base station 301 determines whether there is another cell that uses the same frequency as the specified cell (step S603). If there is no other cell that uses the same frequency, base station 301 ends the process. If there is another cell, base station 301 establishes only an uplink path for that cell (step S604).

When base station 301 receives a path establish request that specifies a cell for which only an uplink paths has been established in response to a request for establishing another cell, base station 301 may establish both uplink and downlink paths for the specified cell. Thus, uplink and downlink paths for multiple cells that use the same frequency are established and only an uplink path is established for the other cell that uses the same frequency.

In this state, base station 301 obtains uplink communication data by combining a signal of the uplink path using the cell specified by base station controller 106 with a signal of the uplink path using the other cell that uses the same frequency as that cell. On the other hand, mobile station 101 obtains downlink communication data from only a signal of the downlink path using the cell specified by base station controller 106. Furthermore, base station 301 transmits TPC information that instructs mobile station 101 to control transmission power only onto a downlink path using a cell specified by base station controller 106, thereby minimizing unnecessary transmission power.

When in this state base station 301 receives a path release request that specifies any cell, base station 301 goes into a state in which only the uplink path is established for the specified cell and does nothing for the other cells. When base station 301 receives a request for releasing the last cell for which uplink and downlink paths have been established, base station 301 releases the paths of the other cells for which only the uplink paths have been established at the same time.

Figure 8:
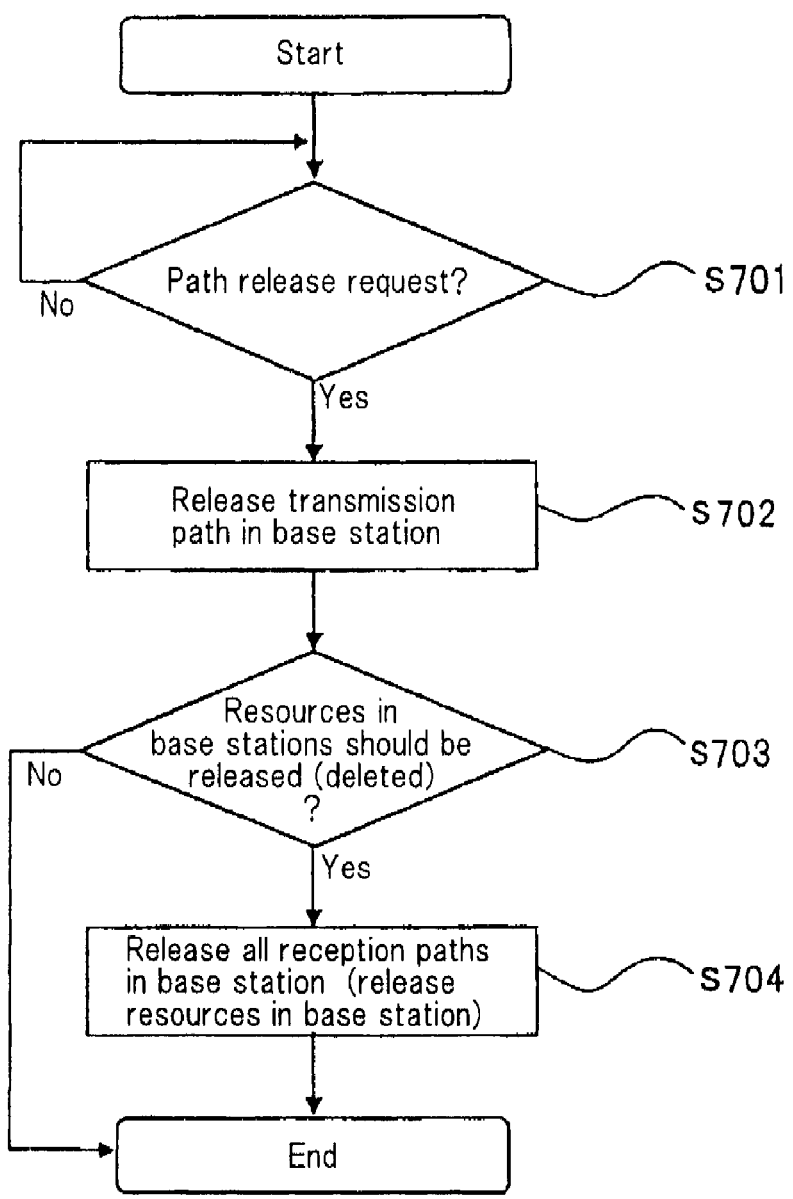
FIG. 8 is a flowchart of a path releasing operation in the mobile communication system according to the fifth exemplary embodiment.

FIG. 8 is a flowchart showing the path release operation performed in the mobile communication system according to the fifth exemplary embodiment. Referring to FIG. 8, base station 301 first monitors for a path release request from base station controller 106 (step S701). When base station 301 receives a path release request, base station 301 releases a downlink (for transmission) path specified in the request (step S702).

Then, base station 301 determines whether another cell that uses the same frequency as the specified cell should be released (step S703). If the path specified in the release request is the last path of the call in base station 301, another cell needs to be released. If the specified path is not the last path, another cell does not need to be released.

If another cell that uses the same frequency does not need to be released, base station 301 ends the process. If another cell that uses the same frequency needs to be released, base station 301 releases all uplink paths of the cell (step S704). When all uplink paths are to be released, resources such as memory of controller 305 are also released at the same time.

While preferred embodiments of the present invention have been described using specific terms, such description is for illustrative purposes only, and it is to be understood that changes and variations may be made without departing from the spirit or scope of the following claims.

What is claimed is:

1. A mobile communication system that enables handover using a plurality of cells, comprising:
a base station which forms a cell for connecting to a mobile station by radio and, when receiving from the mobile station a report of at least two received signal powers of at least two common pilot channels of the plurality of cells received at the mobile station, converts the received at least two signal powers in the report on the basis of transmission powers of the at least two common pilot channels of the plurality of cells thereby adjusting the at least two received signal powers and transfers the report containing the at least two converted received signal powers; and
a base station controller which receives the report transferred by the base station and determines a cell to which the mobile station is to be connected, on the basis of the received at least two signal powers of the at least two common pilot channels of the plurality of cells that are contained in the report;
wherein the base station adjusts the at least two received signal powers to values that reflect estimated losses on transmission paths.

2. A mobile communication system that enables handover using a plurality of cells, comprising:
a base station which forms a cell for connecting to a mobile station by radio and, when receiving from the mobile station a report of at least two received signal powers of at least two common pilot channels of the plurality of cells received at the mobile station, transfers the report; and
a base station controller which receives the report transferred by the base station, converts the at least two received signal powers in the report on the basis of transmission powers of the at least two common pilot channels of the plurality of cells thereby adjusting the at least two received signal powers, and determines a cell to which the mobile station is to be connected, on the basis of the converted at least two received signal powers of the at least two common pilot channels of the plurality of cells;
wherein the base station controller adjusts the at least two received signal powers to values that reflect estimated losses on transmission paths.

3. The mobile communication system according to claim 1 or 2, wherein a conversion of a received signal power is performed to correct the received signal power so that a received signal power of a cell, in which a common pilot channel has a high transmission power, is relatively decreased and a received signal power of a cell, in which the common pilot channel has a low transmission power, is relatively increased.

4. The mobile communication system according to claim 1, wherein a conversion of the at least two received signal powers is performed by further using total received powers of uplink signals of each of the plurality of cells received at the base station.

5. The mobile communication system according to claim 1, wherein a conversion of a received signal power is performed by further using a signal to interference power ratio of a signal of a path that uses the cell at the base station.

6. The mobile communication system according to claim 1, wherein the base station forms a plurality of cells that use the same frequency;
the base station controller requests the base station to connect to the mobile station using a cell determined as the cell to which the mobile station is to be connected;

the base station, in response to a request from the base station controller to connect to the mobile station using the cell, connects to the mobile station using the cell and connects to the mobile station using another cell using the same frequency as the original cell.

7. The mobile communication system according to claim 6, wherein the base station transmits a control signal for controlling transmission power to the mobile station by using only a cell that the base station controller has requested to use to connect to the mobile station.

8. A handover control method in a mobile communication system that enables handover using a plurality of cells, comprising:
   receiving from a mobile station a report of at least two received signal powers of at least two common pilot channels of the plurality of cells received at the mobile station;
   converting the at least two received signal powers in the report on the basis of transmission powers of the at least two common pilot channels of the plurality of cells thereby adjusting the at least two received signal powers; and
   determining a cell to which the mobile station is to be connected, on the basis of the converted received at least two signal powers of the at least two common pilot channels of the plurality of cells;
   wherein the converting the at least two received signal powers comprises adjusting the at least two received signal powers to values that reflect estimated losses on transmission paths.

9. The handover control method according to claim 8, wherein a conversion of a received signal power is performed to correct the received signal power so that a received signal power of a cell, in which a common pilot channel has a high transmission power, is relatively decreased and a received signal power of a cell, in which the common pilot channel has a low transmission power, is relatively increased.

10. The handover control method according to claim 8, wherein a conversion of the at least two received signal powers is performed by further using total received powers of uplink signals of each of the plurality of cells.

11. The handover control method according to claim 8, wherein a conversion of a received signal power is performed by further using a signal to interference power ratio of a signal of a path that uses the cell.

12. The handover control method according to claim 8, wherein a base station included in the mobile communication system forms a plurality of cells that use the same frequency;
   a base station controller requests to connect to the mobile station using a cell determined as the cell to which the mobile station is to be connected;
   the base station, in response to a request from the base station controller to connect to the mobile station using the cell, connects to the mobile station using the cell and connects to the mobile station using another cell using the same frequency as the original cell.

13. The mobile handover control method according to claim 12, wherein the base station transmits a control signal for controlling transmission power to the mobile station by using only a cell that the base station controller has requested to use to connect to the mobile station.

* * * * *